United States Patent
Pintault et al.

(10) Patent No.: US 8,137,442 B2
(45) Date of Patent: Mar. 20, 2012

(54) PROCESS FOR PRODUCING A NANOPOROUS LAYER OF NANOPARTICLES AND LAYER THUS OBTAINED

(75) Inventors: Bruno Pintault, Monts (FR); David Guenadou, Manosque (FR); Luc Bianchi, Artannes (FR); Philippe Belleville, Tours (FR); Karine Valle, Tours (FR); Christophe Boscher, Montbazon (FR); Joël Toulc'Hoat, Joue les Tours (FR)

(73) Assignee: Commissariat a l'Energie Atomique, Paris (FR)

( * ) Notice: Subject to any disclaimer, the term of this patent is extended or adjusted under 35 U.S.C. 154(b) by 368 days.

(21) Appl. No.: 12/298,057

(22) PCT Filed: Apr. 25, 2007

(86) PCT No.: PCT/EP2007/054076
§ 371 (c)(1),
(2), (4) Date: Nov. 20, 2008

(87) PCT Pub. No.: WO2007/122256
PCT Pub. Date: Nov. 1, 2007

(65) Prior Publication Data
US 2009/0241496 A1    Oct. 1, 2009

(30) Foreign Application Priority Data
Apr. 26, 2006 (FR) .................... 06 51477

(51) Int. Cl.
*B01D 53/22* (2006.01)
*B01D 39/20* (2006.01)
*B01D 71/02* (2006.01)
*B32B 3/26* (2006.01)
*C23C 4/10* (2006.01)

(52) U.S. Cl. ........... 96/11; 96/4; 95/45; 55/487; 55/524; 55/DIG. 5; 210/500.21; 210/506; 427/446; 427/447; 427/453; 427/454; 427/455; 428/312.6

(58) Field of Classification Search .................. 96/4, 11; 95/45; 55/486, 487, 523, 524, DIG. 5; 210/500.21, 210/506; 427/446, 447, 453, 454, 455; 428/312.6
See application file for complete search history.

(56) References Cited

U.S. PATENT DOCUMENTS
4,982,067 A    1/1991    Marantz et al.
(Continued)

FOREIGN PATENT DOCUMENTS
EP    1 134 302    9/2001
(Continued)

OTHER PUBLICATIONS
International Search Report completed Apr. 7, 2007, in International Application No. PCT/EP2007/054076, filed Apr. 25, 2007.
(Continued)

*Primary Examiner* — Jason M Greene
(74) *Attorney, Agent, or Firm* — Brinks Hofer Gilson & Lione

(57) ABSTRACT

Process for producing at least one nanoporous layer of nanoparticles chosen from nanoparticles of a metal oxide, nanoparticles of metal oxides, and mixtures of said nanoparticles, on a surface of a substrate, in which at least one colloidal sol, in which said nanoparticles are dispersed and stabilized, is injected into a thermal plasma jet which sprays said nanoparticles onto said surface.
Nanoporous layer and device, especially a separation device, comprizing said layer.

35 Claims, 5 Drawing Sheets

U.S. PATENT DOCUMENTS

| | | | |
|---|---|---|---|
| 5,032,568 | A | 7/1991 | Lau et al. |
| 5,413,821 | A | 5/1995 | Ellis et al. |
| 5,609,921 | A | 3/1997 | Gitzhofer et al. |
| 5,623,375 | A | 4/1997 | Floch et al. |
| 5,698,266 | A | 12/1997 | Floch et al. |
| 5,858,526 | A | 1/1999 | Floch et al. |
| 6,447,848 | B1 * | 9/2002 | Chow et al. .................. 427/446 |
| 2004/0229031 | A1 * | 11/2004 | Gell et al. .................. 427/446 |
| 2008/0090071 | A1 | 4/2008 | Valle et al. |

FOREIGN PATENT DOCUMENTS

| | | |
|---|---|---|
| EP | 1 134 302 A1 * | 9/2001 |
| FR | 2 682 486 | 4/1993 |
| FR | 2 703 791 | 10/1994 |
| FR | 2 707 763 | 1/1995 |
| WO | WO 97/18341 | 5/1997 |

OTHER PUBLICATIONS

French Search Report dated Dec. 4, 2006, in prior French Application No. 0651477, filed Apr. 26, 2006.

International Preliminary Report on Patentability dated Jul. 29, 2008, from corresponding International Application No. PCT/EP2007/054076, filed Apr. 25, 2007.

English language translation of the International Preliminary Report on Patentability from corresponding International Application No. PCT/EP2007/054076, filed Apr. 25, 2007.

Gomez-Romero, Pedro, et al., "Functional Hybrid Materials"., 2004, Wiley—VCH.

Henne, R., et al., "New applications and new product qualities by RF plasma Spraying", Proceedings of the United Thermal Spray Conference, Mar. 17-19, 1999, p. 598-602.

Rao, N. Po., et al., "Nanostructured Materials Production by Hypersonic Plasma Particle Deposition", NanoStructured Materials, 1997, p. 129-132, vol. 9.

Refke, A., et al., "Characterization of LPPS processes under various spray conditions for potential applications", Thermal Spray 2003, Advancing the Science and Applying the Technology, p. 581-588.

Somiya, S., et al. "Hydrothermal Processing of Ultrafine Single-Crystal Zirconia and Hafnia Powders with Homogeneous Dopants", Advances in Ceramics, 1987, p. 43-55, vol. 21.

Stoeber, Werner, et al., "Controlled Growth of Monodisperse Silica Spheres in the Micron Size Range", Journal of Colloid and Interface Science, 1968, p. 62-69, vol. 26.

* cited by examiner

PROCESS FOR PRODUCING A NANOPOROUS LAYER OF NANOPARTICLES AND LAYER THUS OBTAINED

This application is a National Stage application of International Application No. PCT/EP2007/054076, filed Apr. 25, 2007, the entire contents of which is hereby incorporated herein by reference. This application also claims the benefit under 35 U.S.C. §119 of French Patent Application No. 06 51477, filed Apr. 26, 2006, the entire contents of which is hereby incorporated herein by reference.

TECHNICAL FIELD

The present invention relates to a process for producing, or forming, a nanoporous layer of nanoparticles on a surface of a substrate.

The present invention also relates to a nanoporous layer of nanoparticles capable of being obtained (obtainable) by this process.

More precisely, the present invention relates to a process for producing a nanoporous membrane and to the membrane thus produced.

The present invention also relates to devices comprising a nanoporous layer capable of being obtained (obtainable) by the process of the invention.

The technical field of the invention may in general be defined as that of nanostructured materials, more particularly this technical field is that of nanoporous materials in the form of layers, especially thin layers usually called membranes, having a thickness for example of 1 to 100 µm.

Such membranes are applicable in the fields of ultrafiltration, purification, separation of gases or of different phases, heterogeneous catalysis, self-supported chemical reactors, gas-diffusion, and sensors ("preconcentrators").

Nanostructured materials are defined as being materials organized on the nanoscale, that is to say on a scale ranging from a few nm to a few hundred nm. This size range is that corresponding to the characteristic lengths of various physical, electronic, magnetic, optical, superconductivity, mechanical or other processes, and in which the surface plays a predominant role in these processes, thereby giving these "nanomaterials" specific and often extraordinary properties. Owing to these characteristics, such materials truely have the potential of enabling novel high-performance structures having specific properties to be constructed.

The possibility of manufacturing nanostructures enables innovative materials to be developed and offers the possibility of exploiting them in many fields, such as in optics, electronics, energy, etc. These nanomaterials will offer undeniable fundamental spin-offs and important applications and potential applications in various technologies in the future, such as fuel cells, "smart" coatings and resistant (thermal barrier) materials.

The present invention allows novel nanostructured coatings and more precisely nanoporous layers or membranes to be developed by a simple and easily industrializable process and opens up these technologies to industrial concern. The essence of the "nano" concept is the assembly of nanoscale species capable of fulfilling a sophisticated function or of constituting a material having unprecedented properties.

The references between brackets ([ ]) correspond to the list of literature references given at the end of the examples.

PRIOR ART

At the present time there is no simply implementable technique for obtaining coatings or layers of nanoparticles that meet the ever increasing requirements of structural homogeneity, thickness homogeneity, even on the scale of a few microns, mechanical strength and controlled porosity because of the miniaturization of electromechanical and/or optical and/or electrochemical microsystems.

The inventors of the present invention considered plasma spraying or thermal spraying. These are techniques used both in the research laboratory and in industry for preparing deposits, films of ceramic, metallic, cermet or polymer materials, as well as combinations of these materials, on various types of substrate (differing in shape and nature).

The function of the coating, deposit, film is to give the coated part a particular property, namely corrosion protection, thermal barrier, etc. Its principle is based on a plasma jet generated within a torch by an electric arc or by induction. A pulverulent material (ceramic or metal or polymer) is injected—either by a dry route using a carrier gas or by a wet route using a liquid carrier—into this hot high-velocity flow.

In the case of the dry route, the particles are accelerated and melted, impact the part to be coated, and stack up to form the deposit, coating, film.

In the case of the wet route, the liquid is broken up into droplets upon contact with the plasma, then accelerated and vaporized. The resulting solid particles are possibly melted and impact the substrate, where they cool and stack up to form the deposit, film (see FIG. 1).

The dry route is limited by the size of the particles that can be injected into the plasma. Below a critical particle size of about 10 µm, the particles no longer have enough momentum to penetrate into the interior of the plasma jet. They remain on the periphery and are not melted.

The wet route overcomes this physical limitation, but is itself limited by the stability of the liquid/powder (suspension) mixtures.

More precisely, the deposit, film or layer formed by the dry route, generally having a thickness greater than 100 µm, has a highly anisotropic lamellar structure characteristic of deposits, films, layers deposited by plasma spraying. These techniques therefore allow the formation of neither nanoparticulate coatings nor coatings having thicknesses of less than 100 µm, going down to a few microns.

In addition, the coatings obtained have the drawback of having microcracks, especially in the case of ceramic films, brittle materials which thus relieve the internal stresses.

Furthermore, it has been found that the coating obtained has a lamellar structure which largely determines its thermomechanical properties. This therefore clearly limits a priori the potential applications of plasma spraying.

In particular, the appearance of novel applications, especially in microelectronics and "laboratory on a chip" systems, requires films, coatings, deposits to be deposited with a thickness of less than 50 µm, consisting of submicron-size particles that do not necessarily have a lamellar structure, and by using high deposition rates. Now, it is not possible at the present time to make particles smaller in diameter than one micron penetrate into a plasma jet using a conventional injector with a carrier gas, without considerably disturbing the latter. This is because the high velocity, speed of the cold carrier gas, necessary for accelerating fine particles, causes a substantial reduction in the temperature and in the flow velocity, speed of the plasma, these being essential properties for melting and entraining the particles.

It was to overcome these difficulties that the abovementioned wet processes were developed.

Various solutions have been proposed for this purpose. Thus, in document [1], Lau et al. describe the use of an aqueous solution, consisting of at least three metal salts, which is atomized in a non-supersonic inductive plasma. This results in superconducting ceramic deposits, films, but these do not have a nanoscale structure and even less a nanoporous structure.

In document [2], Marantz et al. describe the axial injection of a colloidal solution into a transferred-arc plasma. The production of nanostructured and in particular nanoporous deposits, films is neither mentioned nor suggested. In addition, this process is not easily industrializable as it requires the use of two to four plasma torches operating simultaneously.

In document [3], Ellis et al. describe a process in which an organometallic compound in gaseous or solid form is injected into a non-supersonic inductively coupled plasma. However, the deposit, film formed has neither a nanoscale structure nor a fortiori a nanoporous structure.

In document [4], Gitzhofer et al. describe the use of a liquid charged with particles having a size of the order of one micron. This liquid is injected in droplet form into a plasma by means of an atomizer. This technique is limited to radiofrequency plasmas and the resulting films are neither nanostructured nor nanoporous.

In document [5], Chow et al. describe a method consisting in injecting several solutions into a plasma jet so as to obtain deposits, films that possess a nanoscale structure. However, the final material is the result of an in-flight chemical reaction in the plasma, making the method complicated to control. Furthermore, in this method (which involves a chemical reaction in the plasma), the particles have a size of 100 nm. The method nominally entails a chemical conversion during the spraying process and uses dispersants, while the spraying conditions are explicitly chosen so as not to vaporize the solvent of the sprayed solution before it has reached the substrate.

In other words, the above document describes a nanostructured deposit, film deposited by thermal spraying of a solution and not of a stabilized sol, as in the process according to the invention.

This process makes it possible to convert the atoms/molecules into aerosol droplets and allows the subsequent chemical reactions so as to form the layers of material on the substrate.

This process does not employ a stabilized and dispersed colloidal sol containing nanoparticles, which are sprayed (by a plasma torch) onto a substrate, where they stack up to form a deposit, film.

The precursor solution employed in this document does not constitute a colloidal sol in which the nanoparticles are stabilized and dispersed.

In document [6], Kear et al. propose injecting a solution containing agglomerates of nanostructured powders in the form of a spray into a plasma. The use of a spray imposes various steps so that the size of the particles to be injected is large enough (of the order of one micron) to penetrate into the plasma, namely drying of the solution containing the small particles, agglomeration of these particles using a binder, and formation of a colloidal suspension consisting of agglomerates larger in size than one micron. This process requires the assistance of ultrasound or the use of dispersants, for example surfactants, in order to keep the particles dispersed in the liquid as a suspension.

To summarize, in the above document, the particles cannot truly be described as nanoparticles, but rather as an agglomerate of nanoparticles and, furthermore, this document does not employ a colloidal sol in which the particles are stabilized and dispersed.

In document [7], N. P. Rao et al. describe a method in which gaseous precursors, injected radially into an arc plasma, give rise to the in-flight formation of solid particles by nucleation/growth. However, the thickness of the deposits, films formed cannot exceed around ten microns and it is not possible to produce all types of material.

Document US 2004/0229031 A1 (Maurice Gell et al.) [18] describes the formation of a nanostructured material by thermally spraying a precursor solution.

The precursor solution is produced by dissolving the precursor in a solvent. This document cites inter alia, as precursor, zirconium nitrate, aluminium nitrate, cerium acetate and zirconium carbonate and, as solvent, water, alcohols containing 1 to 5 carbon atoms, organic solvents, carboxylic acids and combinations thereof. In the case of a complex material, the elementary components are mixed together with the desired stoichiometry.

In no case does this document use colloidal suspensions or sols containing nanoparticles. Moreover, the solution injected into the plasma is modified by pyrolysis so as to form the material of the deposit, film. In the process according to the invention, both the structure and the composition of the nanoparticles forming the sol are again found in the film. The process for producing the layer according to the above document is therefore different from that according to the invention.

Document EP-A1-1 134 302 [19] describes a process for producing nanostructured layers by what is called "compartimentalised solution thermal spraying". The films are produced by injecting a solution of "nanocompartments" into a thermal jet. These nanocompartments may be a dispersion, an emulsion, a microemulsion or a sol-gel system. In particular, they are oil/water or water/oil bicontinuous dispersions stabilized by surfactants, in which the continuous phase is in the form of droplets ranging in size between 150 angstroms and 1 micron.

The injected solution is limited to solutions of metallic materials. In the examples, a flame fed with butane/propane is used, thereby limiting its temperature to 1200° C. Because of this low temperature, only metallic materials having a low melting point can be used.

Moreover, this document does not describe the means of injection into the thermal jet.

The process according to the invention uses a fundamentally different technique, namely plasma spraying in which much higher flame temperatures, generally close to 12000° C. on emission from the torch, are used. Such a temperature allows the use of metal oxides, which are used in sol form and are injected into the plasma in order to form the deposit, film. In contrast, in document EP-A1-1 134 302 A1, only metals are used.

Moreover, it may be noted in document EP-A1-1 134 302 A1 that the nature of the sol-gel system is not described, nor is its production. In the detailed description in this document, only nanocompartments are described, being in the form of a microemulsion and not a sol.

The problems associated with the plasma technique are therefore very numerous, as are the solutions proposed, but none of these solutions presently allows all these problems to be solved.

The inventors also considered existing sol-gel deposition processes, especially in the field of coatings in optics. These processes normally use liquid deposition methods, such as spin coating, laminar-flow or meniscus coating, dip coating and spray coating. These various techniques result in thin films having a thickness of generally less than one micron. Some of these deposition processes allow large areas to be coated, for example, ranging from several hundred cm² to several m², which is an advantage.

However, the coatings obtained by these processes crack beyond critical thicknesses of the order of one micron. The main cause of this major defect lies in the tensile stresses applied by the substrate during the heat treatments necessary for producing them. Another drawback lies in the impossibility of depositing homogeneous coatings having good adhesion, even for thicknesses greater than a few microns.

The problems associated with this other technique are therefore also very numerous, even though recent techniques have allowed some of them to be solved by acting on the chemical composition of the sol-gel solutions.

If we now consider nanoporous membranes, all of their applications make use of the principle of molecular separation or filtration, which consists in removing impurities from a fluid by blocking them on the surface or within the thickness of the filtering body.

In conventional filtration, with membranes having pores of micron or millimeter size (sieve, foam, sandbed, etc.), the impurities correspond to solid particles in suspension in the fluid.

In the case of ultrafiltration, for which the membrane has a pore size distribution between 1 and 100 nm, the impurities correspond to macromolecules or colloids. The latter, because they are larger in size than the largest pore passing through the membrane, remain blocked on the surface or within the thickness of the membrane. This process is suitable for liquids and gases. Ultrafiltration membranes are qualified by the largest through-pore of the membrane. This corresponds to the smallest entity that can be retained. Usually, the filtration performance is expressed in daltons (having the symbol Da, where 1 Da=$1.660\times10^{-24}$ g/molecule=1 g/mol), this being the measurement unit for the mass of a molecule. The ultrafiltration range generally extends from 15 to 300 kDa. As examples of ultrafiltration applications, the following may be mentioned:
    the concentration of macromolecular solutions (proteins, polysaccharides, etc.) in the agri-food industry;
    the removal of macrosolutes present in effluents or in water for domestic use, industrial use (the electronics industry requires clean fluids) and medical use;
    the separation of oil from water; and
    the clarification and/or purification of liquids.

Phase separation, usually carried out by settling, can be performed by means of membranes having a hybrid (mixed) affinity character as regards the phases to be separated: hydrophilic/hydrophobic, acid/base, oxidizing agent/reducing agent, donor/acceptor character, etc.

For example, the surface of the membrane may be naturally hydrophobic (for example polytetrafluoro-ethylene) or may be functionalized by covalent grafting of hydrophobic molecules (for example of the fluorinated or alkyl type). The nanoscale pore size increases the separation-filtration efficiency, which cannot be completely provided by the hydrophobicity (Jurin's law).

The benefits of this type of phase separator are:
    its compactness, the membrane and its support being thin (from one to a few millimeters in thickness);
    its use in line—this system can be readily integrated into a pipe;
    the possibility of using it in any position, whereas a settling process requires orientation according to the direction of gravity;
    use at high temperature and at high pressure.

The ceramic membrane is not thermally degraded and a graft of perfluorinated molecules via an organometallic function (of the alkoxysilane type) is stable up to about 300° C.; and
    deposition of such a membrane on any type of support (ceramic, metallic, glass, crystalline, etc.).

Chosen membranes are commonly made of organic polymer materials: cellulose, polyethersulphone, polypropylene, polytetrafluoroethylene, etc.

This type of membrane is not thermally and chemically stable. The maximum use temperature of the best materials does not exceed 110° C. (polyethersulphone). The chemical compatibility with regard to the fluid to be treated must be attentively studied. Moreover, the admissible pressure ranges remain low because of the compressibility of polymer materials—at high pressure, the polymer densifies, making the membrane completely impervious.

Ceramic nanoporous membranes do not have these drawbacks. They are thermally stable since their maximum operating temperature, for non-functionalized membranes, is only determined by the melting point or softening temperature of the oxide matrix, and this may therefore in certain cases exceed 1000° C. They are also chemically stable as they essentially consist of metal oxides. Because of their rigid structure, they may operate under high pressure. These properties allow them to be cleaned and sterilized for reuse, making them economically advantageous. However, they remain more difficult to implement.

Several patents and patent applications mention manufacturing techniques. Most of them are based on coating/sintering techniques.

U.S. Pat. No. 6,261,510 (TNO) proposes the manufacture of nanoporous tubes by extruding a sufficiently viscous mixture of a submicron ceramic powder, a solvent and a binder. The final step is a sintering step. This patent is limited to tubular geometries.

In U.S. Pat. No. 5,342,431, the nanoporous membrane is formed by coating a porous support with a ceramic colloidal suspension. A heat flux is imposed on the face opposite the coating, so that the particles are deposited as a gel. The manufacture is completed by sintering. The authors state that a mean pore size of less than 30 angstroms is obtained.

Application WO-A-99/11582 filed by the Pall Corporation (USA) proposes formation by precipitation of a preceramic polymer on a substrate followed by sintering. The authors state that a high porosity (greater than 50%) is obtained and that the size and shape of the pores are controlled. This technique remains utilizable for a range of materials restricted to preceramic polymers (for example, polysiloxanes, polysilanes, etc.) and always includes a final sintering step.

For all these processes, the sintering step precludes the creation of a nanoporous membrane on a heat-sensitive substrate.

To summarise, none of these techniques of the prior art allows a nanoporous coating of nanoparticles with a thickness greater than 10 µm to be obtained. These techniques do not indicate a promising way of simply achieving this and are limited to simple geometries, for example tubular or planar geometries.

Furthermore, these techniques are generally less productive in so far as they require the use of a combination of several processes for the final forming operation.

SUMMARY OF THE INVENTION

One goal of the present invention is specifically to provide a process for forming a nanostructured coating, more precisely a nanoporous layer that meets the abovementioned requirements and solves all the aforementioned drawbacks.

Another goal of the present invention is to provide a nanoparticulate coating, more precisely a nanoporous layer that does not have the drawbacks, defects and disadvantages of the coatings of the prior art and can be used in devices, such as separation devices, presenting excellent performance.

These goals and other ones are achieved in accordance with the invention by a process for producing at least one nanoporous layer of nanoparticles chosen from nanoparticles of a metal oxide, nanoparticles of metal oxides, and mixtures of said nanoparticles, on a surface of a substrate, in which at least one colloidal sol, in which said nanoparticles are dispersed and stabilized, is injected into a thermal plasma jet which sprays said nanoparticles onto said surface.

The inventors are the first to solve the aforementioned drawbacks of the techniques of the prior art relating to plasma deposition using this process. Compared with the previous techniques, the process consists in particular in replacing the injection gas used in the dry route by a specific carrier liquid consisting of a colloidal sol. The sprayed particles are thus stabilized in a liquid medium before being accelerated in a plasma.

As explained above, more recent studies relating to the injection of a material in other than pulverulent form, and especially in liquid form, into a plasma have already been carried out. However, none of these studies either uses or suggests direct injection of a colloidal sol, or colloidal sol-gel solution, of nanoparticles into a plasma jet and the possibility of depositing nanostructured films of any type of material possessing the same chemical composition and the same structural composition as the initial product.

More precisely, the deposition of nanoparticulate films in the form of nanoporous layers, also called nanoporous membranes, has neither been described nor suggested in the prior art.

In other words, the process according to the invention may be defined as a plasma-jet thermal spraying process using a wet route, implemented with a specific liquid, which is a sol with nanoparticles of course, one or more sols may be employed in succession or simultaneously.

Within the context of the wet route, the sol-gel process offers many options in the synthesis of stable nanoparticulate colloidal suspensions. This "soft" chemistry makes it possible in particular to synthesize metal oxides from inorganic or organometallic precursors. The nucleation of these particles takes place in liquid medium. These nanoparticles may be directly stabilized in this same solvent during the synthesis or may be peptized subsequently, if they are synthesized by precipitation. In both cases, the colloidal suspension obtained is called a sol. The particle size, ranging from a few angstroms to several microns, is perfectly controlled by the synthesis conditions (precursors, solvent, pH, temperature, etc.).

The process of the present invention also makes it possible, unexpectedly, to maintain the nanostructural properties of the sprayed material, thanks to the thermal spraying of a stabilized suspension (sol) of nanoparticles. The process of the invention using "self-stabilized" sols dispenses with the use of ancillary dispersion means, such as ultrasound, atomization, mechanical stirring, etc. during the spraying phase. Consequently, the present invention makes it possible both to maintain the purity of the sprayed material and to simplify the implementation process. It is also in particular thanks to the use of a sol that the aggregation of the nanoparticles is limited and that the process of the invention results in a homogeneous nanostructured coating, more particularly in a nanoporous layer.

In addition, thanks to the process of the present invention, the inventors exploit the singular advantage of sol-gels in offering very many physico-chemical ways of obtaining stable nanoparticulate colloidal suspensions. The soft chemistry of sol-gel formation makes it possible in particular to synthesize, from very many inorganic or organometallic precursors, a number of different metal oxides.

Furthermore, the present invention also uses the advantageous property of sol-gels of allowing inorganic particles of different crystalline phases (the case of zirconia, for example) to be synthesized in the same sol, for example using the hydrothermal route or under softer conditions. In this chemistry, the particles are nucleated in liquid medium. Access to hybrid colloidal sols, for example composed of a mixture of nanoparticles of metal oxides of different nature and/or nanoparticles of a metal oxide doped by another metal oxide and/or any mixture of nanoparticles of a metal oxide and nanoparticles of metal oxides doped by another metal oxide, also offers very many alternatives.

Moreover, thanks to the process of the invention, it is possible to further improve and refine the homogeneity and stability of the sol by judiciously selecting the particle size of the sol and the solvent used. Specifically, the preferred conditions of the process of the invention make it possible to limit even more, or indeed eliminate, any segregation, concentration gradients or sedimentation of the nanoparticles.

In addition, by varying the plasma spraying conditions and the sol injection protocols, it is possible to modify the quality of the nanoparticulate coating formed and, according to various examples presented below, to further improve the quality and to better maintain properties of the colloidal sol particles within the coating material.

In other words, the principle of producing, or forming, the nanoporous layer by the process according to the invention relies on injecting a colloidal sol composed of nanoparticles into a thermal plasma jet. The nanoparticles of this sol are sprayed and stack up on a substrate to form the nanoporous film. These nanoparticles are metal oxide nanoparticles and do not undergo any modification upon being sprayed. Consequently, the film or layer produced by the process according to the invention has the same composition as the initial sol.

The process of spraying a sol, implemented according to the invention, consists in injecting a liquid, which is a colloidal sol in which the nanoparticles are dispersed and stabilized, into a generally high-velocity high-temperature thermal plasma.

The continuous liquid jet, owing to the effect of the high velocities upon exiting the torch, which are generally equal to or greater than 1000 m/s and preferably from 1000 to 2000 m/s, breaks up into fine droplets, generally 2 to 20 microns, for example around ten microns, in diameter. This diameter essentially depends on the nature of the injected liquid. These droplets, subjected to high velocities and temperatures (for example 12000 K at the torch exit), are accelerated and evaporate, so as to include the solid nanoparticles of the initial sol in the plasma jet. The particles, whether individual or aggregated in the form of clusters exposed to these high temperatures, heat up and melt before impacting the substrate, i.e. colliding with the substrate, in order to be stacked up and thus form the deposit, film.

Their velocity on impacting the substrate is low compared with the conventional powder spraying technique. This is because, since the nanoparticles have a very low mass, they are carried along by the plasma flow. However, the velocity of the gases is greatly reduced on the substrate because of the obstacle (stop point) that this constitutes.

To produce a porous structure with the process according to the invention using pulverulent materials, it is necessary to create stacking faults between the particles during construction of the film.

The mechanisms describing the production of a nanostructured deposit, film by the technique of spraying a sol allow the key factors leading to stacking faults and thus to a nanoporous structure to be determined.

To obtain a deposit, film, the particles must be molten so as to fuse together. If this is not the case, they will rebound from the surface of the substrate because of their momentum. However, to create stacking faults, the particles before impact must be in a partially molten state. In conventional powder spraying with a particle size greater than one micron, the partially molten state does not allow a deposit, film to be obtained: the non-molten core rebounds from the substrate and prevents the material from adhering to the surface.

However, in the case of spraying a sol, the partially molten nanoparticles, because of their low velocity, in general 20 to 1 m/s and even less than 1 m/s, fuse together on their periphery upon impact, without rebounding from the substrate: they undergo slight sintering.

This partial melting may be obtained by protecting the nanoparticles from the thermal flux of the plasma.

The temperature at the torch exit cannot be lowered to below 8000 K by varying the plasma parameters, such as the intensity of the current, the type of gas, the flow rate, etc.

It has been demonstrated according to the invention that two means allow the melting of the nanoparticles to be easily limited, namely:

by choosing the solvent for the sol in such a way that it protects the nanoparticles from the high temperatures—injection then takes place in a "hot" zone of the plasma, namely a zone in which the temperature ranges in general from 8000 to 15000 K;

by injecting the sol directly into a "cold" zone of the plasma—a cold zone is understood in general to mean that the temperature therein is from 3000 to 4000 K.

In the case of the first approach, in which the particles are protected from the plasma flux, two factors are key in determining the choice of solvent:

it must consume a large amount of energy to evaporate, that is to say it must have a high heat capacity and a high latent heat of evaporation. Thus, according to the mechanisms inherent in spraying a suspension or a sol, the droplets evaporate over a longer distance in the plasma, releasing the solid nanoparticles in colder isotherms of the plasma. This allows the clusters of nanoparticles or the individual nanoparticles to undergo partial melting and therefore slight sintering on the substrate; and it must form large-diameter droplets, that is to say those having a high surface tension. Thus, the larger the droplets, the more the liquid evaporates over a long distance. The nanoparticles are melted in colder isotherms of the plasma and as a result the structure undergoes slight sintering.

Water for example meets these two criteria perfectly: the heat capacity (4180 J/K/kg), the latent heat of evaporation ($2.3 \times 10^6$ J/kg) and the surface tension ($72.75 \times 10^{-3}$ N/m at 293 K) are very high. The solvent for said sol may be chosen, apart from water, from liquids that consume a large amount of energy to vaporize.

Examples 1, 2 and 4, which are given below, are therefore produced with aqueous silica sols.

In the case of the second approach, the sol or suspension is injected directly into the "cold" zones of the plasma, namely the zones in which the temperature is generally from 3000 to 4000 K. In general, these lie at 50-60 mm from the torch exit, but are highly dependent on the plasma conditions used, such as the current, the plasma-forming gas, the flow rate, the torch diameter, etc.

This time, the solvent for the sol must be chosen in such a way that it creates fine droplets and evaporates as rapidly as possible. This is because in the "cold" zones, the velocities are much lower, for example in particular 200 m/s, making the fragmentation into droplets less good. This results in slower evaporation because of larger droplets and a less intense plasma flux. If the liquid is completely evaporated too far downstream, the temperature of the jet becomes too low to melt, even partially, the nanoparticles.

The solvent must have a low latent heat, a low heat capacity and a low surface tension.

In general, alcohols, for example 1C to 5C aliphatic alcohols such as ethanol and methanol, meet these criteria.

Ethanol in particular meets these requirements (specific heat: $2.44 \times 10^3$ J/Kg/K; latent heat of evaporation: $8.7 \times 10^5$ J/kg; surface tension: $21.98 \times 10^{-3}$ N/m at 293 K).

The deposit, film thus produced is very porous.

The pore size depends on the size of the nanoparticles and on their morphology. For the same morphology, the larger the particles, the more extensive the stacking faults and the larger the equivalent diameter of the pores. This characteristic enables the diameter of the pores to be varied so as to precisely obtain a given pore size distribution centred on one size.

FIG. 8 illustrates the structure of two films produced from spherical particles of different sizes.

The stacking faults may be amplified by using a mixture of sols having different particle sizes in similar proportions (i.e. in the case of a mixture of two sols for example, the difference in volume proportions between the two constituents does not exceed 10% by volume), or even identical proportions. The diameter of the pores in the membrane can thus be increased.

Thus, FIG. 8 (on the left) shows the production of a membrane with a small pore size, namely for example centred on 10 nm (pore diameter p=size of the stacking fault), with particles having a small diameter d, for example 25 to 35 nm.

If a sol having a larger particle size is used, for example with particles having a diameter D of 50 to 60 nm as shown in the diagram on the right in FIG. 8, then the size of the stacking faults, and therefore the pore diameter (P) will also be increased, for example to 30 nm.

In FIG. 8, d<D and consequently p<P.

FIG. 8 also shows the slight sintering obtained by the process according to the invention, which exists at the points of contact between the particles of the deposit, film.

This slight sintering is obtained because of the conditions generally employed in the process of the invention.

Moreover, a bimodal pore size distribution (centred on two size values) may be obtained using mesoporous particles in the sol spraying process. The overall porosity of the material is formed by the stacking faults and by the intrinsic porosity of the nanoparticles. Since the two are not coupled, two ranges of pores are obtained.

The morphology of the particles plays an important role: the shape of the nanoparticles determines not only the diameter of the pores but also their shape. By modifying the latter, it is possible to vary the tortuosity of the porous material and thus increase or decrease the permeance of the membrane. Thus, apart from having the form of a sphere, the nanoparticles may have the form of a cube or a hexahedron or any other crystalline form that can be obtained by a sol-gel process.

The definitions and the preferred general operating conditions of the process of the invention are explained below.

According to the invention, the substrate may be organic, inorganic or hybrid (i.e. organic and inorganic on the same surface). Preferably, it withstands the operating conditions of the process of the invention. For example, the substrate may consist of a material chosen from: semiconductors, such as silicon; organic polymers, such as polymethylmethacrylate (PMMA), polycarbonate (PC), polystyrene (PS), polypropylene (PP) and polyvinyl chloride (PVC); metals, such as gold, aluminium and silver; glasses; mineral oxides, for example in film, layer form, such as $SiO_2$, $Al_2O_3$, $ZrO_2$, $TiO_2$, $Ta_2O_5$, MgO, etc.; and composite or hybrid (mixed) materials comprising several of these materials.

According to the invention, the production of the nanoporous layer of nanoparticles, in other words the forming of the membrane, may be carried out on a large number of supports or substrates, the deposition temperature being controlled. This permits heat-sensitive supports or substrates, metal supports or substrates and ceramic supports or substrates to be chosen, thereby enabling the overall cost of producing the supported selective membrane to be reduced.

The nanoporous layer may be deposited in a wide variety of forms, in particular on all kinds of convex and/or concave surfaces and on surfaces of cavities internal to parts, provided that these cavities can receive the thermal spraying device.

The surface of the substrate that it is desired to coat will optionally be cleaned so as to remove the organic and/or inorganic contaminants which could prevent the deposition of the coating on the surface, or even its attachment thereto, and so as to improve the adhesion of the coating. The cleaning used depends on the nature of the substrate and may be chosen from physical, chemical or mechanical processes known to those skilled in the art. For example, in a non-limiting way, the cleaning process may be chosen from immersion in an organic solvent and/or washing (with a detergent) and/or acid pickling, these cleaning operations being assisted by ultrasound and optionally being followed by rinsing with municipal water followed by rinsing with deionized water. These rinsing operations are optionally followed by a drying operation by lift-out, by spraying with an alcohol, by a compressed-air jet, with hot air, or by infrared radiation. The cleaning may also be by ultraviolet radiation.

The term "nanoparticles" is understood to mean particles of nanoscale size, generally ranging from 1 nm to a few hundred nanometers, namely in general 1 to 500 nm, preferably 1 to 100, more preferably 1 to 50 nm, better 2 to 40 nm, even better 5 to 30 nm and even better still 10 to 20 nm. The term "particles" is also used. The particle size distribution of the solution injected into the plasma may be centred on a single peak (monodisperse distribution) or on several peaks. The mean pore size of the membrane is controlled by the size distribution of the particles constituting the sol.

The pore size of the nanoporous layer or membrane may thus be easily set to a given value. The pore size of the nanoporous membrane or layer is thus generally from 1 to 500 nm, preferably 1 to 100 nm, more preferably 1 to 50 nm, better 2 to 40 nm, better still 5 to 30 nm and even better still 10 to 20 nm.

Moreover, there is a relatively small dispersion in the pore size compared to its average value. This constitutes an advantage in the case of ultrafiltration, since the membranes are qualified by the largest through-pore of the membrane. The degree of porosity obtained may be equal to or greater than 20%, preferably equal to or greater than 50%. This value is relatively high in the case of a porous ceramic material obtained by plasma spraying. It indicates that the membrane is very permeable and that the intrinsic pressure drop across the membrane is low. For example, for alumina/silica membranes 50 μm in thickness, the permeance levels vary between 200 and 1300 Sl/min/bar/$m^2$ depending on the pore size.

The expression "sol-gel process" is understood to mean a series of reactions in which soluble metallic species hydrolyse to form a metal hydroxide. The sol-gel process involves the hydrolysis-condensation of metal precursors (salts and/or alkoxides) enabling particles to be easily stabilized and dispersed in a growth medium.

The term "sol" is understood to mean a colloidal system in which the dispersion medium is a liquid and the dispersed phase is a solid. The sol is also called a "colloidal sol-gel solution" or a "colloidal sol". The nanoparticles are dispersed and stabilized thanks to an electrostatic effect (charging of the particles) or a steric effect (polymeric encapsulation for example).

According to the invention, the sol may be produced by any process known to those skilled in the art. Of course, processes for obtaining greater homogeneity in size of the nanoparticles and also greater stabilization and dispersion of the nanoparticles will be preferred. The processes for producing the colloidal sol-gel solution described here include the various conventional processes for synthesizing stabilized nanoparticles dispersed in a liquid medium.

The sol may for example be produced by precipitation in an aqueous medium or by sol-gel synthesis in an organic medium starting from a nanoparticle precursor.

It is also possible to produce such a sol by simply adding a nanoparticulate powder to a solvent or else a hybrid sol may be produced by adding a nanoparticulate powder or several such powders, for example monodisperse powder(s), to a sol produced by one of the processes described herewith.

When the sol is produced by precipitation in an aqueous medium starting from a nanoparticle precursor, the production may for example comprise the following steps:

step 1: hydrothermal synthesis of the nanoparticles by use of an autoclave, starting from metal precursors, or synthesis of the nanoparticles by coprecipitation at ordinary pressure;

step 2: treatment of the nanoparticles (powder), dispersion and stabilization of the nanoparticles in an aqueous medium (washings, dialysis);

step 3 (optional): modification of the stabilizing solvent: dialysis, distillation, solvent mixture; and step 4 (optional): dispersion of the nanoparticles in an organic medium so as to form an organic/inorganic hybrid sol by dispersing the particles within an organic polymer or oligomer and/or by functionalizing the surface of the particles by any type of reactive or non-reactive organic functional group.

The nanoparticles produced by this process are generally particles consisting of one or more metal oxides.

Documents [8] and [9] describe examples of this production method by precipitation in an aqueous medium, using various precursors (metalloid salts, metal salts, metal alkoxides) that can be used for implementing the present invention.

When the sol is produced by sol-gel synthesis in an organic medium starting from a nanoparticle precursor, the production may comprise for example the following succession of steps:

step (a): hydrolysis-condensation of organometallic precursors or metal salts in an organic or aqueous alcoholic medium;

step (b): nucleation of the stabilized nanoparticles dispersed in an organic or aqueous alcoholic medium by maturing (ageing) or growth; and step (c) (optional): formation of an organic/inorganic hybrid sol by dispersing the particles within an organic polymer or oligomer and/or by functionalizing the surface of the particles by any type of reactive or non-reactive organic functional group.

The nanoparticles produced by this process are generally particles consisting of one or more metal oxides.

Document [10] describes examples of this production method by sol-gel synthesis in an organic medium, using various precursors (metalloid salts, metal salts, metal alkoxides) that can be used in the present invention.

Thus, as explained above, the nanoparticles may be directly stabilized in the solvent used during the synthesis or peptized subsequently if they are synthesized by precipitation. In both cases, the suspension obtained is a sol.

According to the invention, whatever the chosen production method, the nanoparticle precursor is typically chosen from the group comprising a metalloid salt, a metal salt, a metal alkoxide or a mixture of these. The aforementioned documents illustrate this technical aspect.

For example, the metal or metalloid of the nanoparticle precursor salt or alkoxide may for example be chosen from the group comprising silicon, titanium, zirconium, hafnium, aluminium, tantalum, niobium, cerium, nickel, iron, zinc, chromium, magnesium, cobalt, vanadium, barium, strontium, tin, scandium, indium, lead, yttrium, tungsten, manganese, gold, silver, platinum, palladium, nickel, copper, cobalt, ruthenium, rhodium, europium and other rare earths.

The sol may also be produced by preparing a mixture of nanoparticles dispersed in a solvent, it being possible for each family to be obtained from the production methods described in documents [8], [9] and [10].

Whichever of the various ways is used to obtain the sol in the process of the invention, it should be clearly understood that a mixture of various sols may be used that differ by their chemical nature and/or their production process and/or their particle size and/or their solvents and/or the structure of the nanoparticles (these being dense or intrinsically nanoporous).

The nanoparticles of the sol used in the process according to the invention are chosen from nanoparticles of a metal oxide (the oxide being a simple or mixed oxide), nanoparticles of metal oxides (i.e. a mixture of several oxides); and mixtures of these.

The metal oxide or metal oxides may be chosen from $SiO_2$, $ZrO_2$, $TiO_2$, $Ta_2O_5$, $HfO_2$, $ThO_2$, $SnO_2$, $VO_2$, $In_2O_3$, $Sb_2O_3$, $CeO_2$, $ZnO$, $Nb_2O_5$, $V_2O_5$, $Al_2O_3$, $Sc_2O_3$, $Ce_2O_3$, $NiO$, $MgO$, $Y_2O_3$, $WO_3$, $BaTiO_3$, $Fe_2O_3$, $Fe_3O_4$, $Sr_2O_3$, $(PbZr)TiO_3$, $(BaSr)TiO_3$, $Co_2O_3$, $Cr_2O_3$, $Mn_2O_3$, $Mn_3O_4$, $Cr_3O_4$, $MnO_2$ and $RuO_2$ and consequently the sol used in the process of the present invention will be able to comprise, for example, nanoparticles of a metal oxide chosen from the group comprising $SiO_2$, $ZrO_2$, $TiO_2$, $Ta_2O_5$, $HfO_2$, $ThO_2$, $SnO_2$, $VO_2$, $In_2O_3$, $Sb_2O_3$, $CeO_2$, $ZnO$, $Nb_2O_5$, $V_2O_5$, $Al_2O_3$, $Sc_2O_3$, $Ce_2O_3$, $NiO$, $MgO$, $Y_2O_3$, $WO_3$, $BaTiO_3$, $Fe_2O_3$, $Fe_3O_4$, $Sr_2O_3$, $(PbZr)TiO_3$, $(BaSr)TiO_3$, $Co_2O_3$, $Cr_2O_3$, $Mn_2O_3$, $Mn_3O_4$, $Cr_3O_4$, $MnO_2$, $RuO_2$ or a combination of these oxides, for example by doping the particles or by mixing the particles.

Of course, this list is not exhaustive since it includes all the metal oxides described in the aforementioned documents.

The sols according to the invention may be described as being sols of ceramic nanoparticles. In particular, sols of nanoparticles of metal(s) oxide(s) will be used, such as zirconia, alumina, silica, hafnium oxide (hafnia), titanium dioxide (titania) etc., the particles being dense, porous, microporous, macroporous or mesoporous.

The size of the nanoparticles in the sol obtained is perfectly controlled by its synthesis conditions, in particular by the nature of the precursors used, the solvent or solvents, the pH, the temperature, etc. and may range from a few angstrom units to several microns. This control of the particle size in the production of the sols is described for example in document [12].

According to the invention, for example in the applications mentioned herein, the nanoparticles generally have a size of 1 to 500 nm, preferably 1 to 100 nm, more preferably 1 to 50 nm, better 2 to 40 nm, better still 5 to 30 nm and even better still 10 to 20 nm, in particular for the purpose of being able to produce nanoporous layers or coatings, also called thin or nanoporous membranes, for example with a thickness ranging from 0.1 μm to several millimeters, for example 5 mm, preferably 0.1 μm to 500 μm, for example 1 to 100 μm and better still 2 to 50 μm.

However, in general the layers according to the invention have a thickness equal to or greater than 10 μm, preferably greater than 10 μm and up to 20, 50, 100, 200, 500 or 1000 μm.

Beside the nanoparticles, the sol also comprises a carrier liquid, which derives from its manufacturing process, called the growth medium. This carrier liquid is an organic or inorganic solvent such as those described in the aforementioned documents. It may for example be a liquid chosen from water, alcohols, ethers, ketones, aromatic compounds, alkanes, halogenated hydrocarbons or any mixture thereof. The pH of this carrier liquid depends on the process for manufacturing the sol and on its chemical nature. It is generally from 1 to 14.

The rheology of the sol may be adjusted so as to be compatible with the injection system. The loading factor, ratio, defined by the ratio of the solid mass to the solvent mass, must preferably remain low enough not to make the solution too viscous. The loading factor generally varies from 1 to 30% by weight, preferably 1 to 10% by weight.

In the sols obtained, the nanoparticles are dispersed and stabilized in their growth medium, and this stabilization and/or dispersion may be promoted by the process for producing the sol and by the chemistry used (see above). The process of the present invention utilizes this property of the sols.

According to the invention, the sol may further comprise organic molecules. These may for example be molecules for stabilizing the nanoparticles in the sol (however, in the sols used according to the invention the nanoparticles are generally self-stabilized, and the addition of stabilizing molecules is therefore not generally necessary) and/or molecules that functionalize the nanoparticles. They may also be texturizing molecules or polymers intended to make the particles porous, preferably mesoporous.

Specifically, an organic compound may be added to the nanoparticles so as to give them a particular property. For example, stabilizing these nanoparticles in a liquid medium by a steric effect results in what are called class I organic/inorganic hybrid materials. The interactions that govern the stabilization of these particles are weak electrostatic interactions of the hydrogen or Van der Waals bonding type. Such compounds that can be used in the present invention, and their effect on the sols, are described for example in document [13].

According to the invention, the particles may also be functionalized by an organic compound either during synthesis, by introducing suitable organomineral precursors, or by grafting onto the surface of the colloids. Examples were given above. These materials are then called class II organic/inorganic materials since the interactions between the organic component and the mineral particle are strong, of the covalent or ionic-covalent type. Such materials and the process for obtaining them are described in document [13].

The properties of the hybrid materials that can be used in the present invention depend not only on the chemical nature of the organic and inorganic components used to form the sol, but also on the synergy that may occur between these two chemistries. Document [13] describes the effects of the chemical nature of the organic and inorganic components used and of such synergies.

The nanoparticles of the sol may be dense (i.e. non-porous) nanoparticles or else intrinsically porous, microporous, macroporous, or preferably mesoporous or mesostructured, nanoparticles.

According to one particularly advantageous embodiment of the present invention, all or some of the nanoparticles of the sol are intrinsically porous, microporous, macroporous, mesoporous or mesostructured nanoparticles. Preferably, all or some of the particles are mesoporous or mesostructured.

In fact, the sol-gel process also offers innovative strategies in the construction of mesoporous, in particular organized mesoporous, materials.

These mesoporous materials are solids having within their structure pores possessing an intermediate size between that of micropores (zeolite-type compounds) and that of macroscopic pores (2 nm<$d_{pore}$<50 nm). These pores may be organized in a periodic or quasi-periodic structure, in which case these materials are then called mesostructured materials.

Thus, the intrinsically mesoporous nanoparticles may be synthesized by the following process:

sol-gel synthesis of intrinsically mesoporous nanoparticles:
  step 1: hydrolysis-condensation of organometallic precursors or of metallic salts in the presence of a texturizing or pore-forming agent;
  step 2: nucleation of the stabilized nanoparticles dispersed in an organic medium or in an aqueous medium by maturing (ageing) and growth; and
  step 3 (optional): removal of the texturizing or pore-forming agent by dialysis, washing or calcination.

It should be noted that these intrinsically mesoporous and/or mesostructured particles are generally metal(s) oxide(s) particles.

For example, these mesoporous materials may be produced by inorganic polymerization within organized molecular systems (OMS) of surfactants or within organized polymeric systems (OPS) of block copolymers. When such texturizing agents are present, this soft chemistry also makes it possible to synthesize, from inorganic or organometallic precursors, metal oxide nanoparticles that are intrinsically mesostructured.

It is also possible for the particles contained in the sprayed sol to be dense or mesoporous particles and to be combined or not with a texturizing or pore-forming agent, such as for example a surfactant.

The process of the invention comprises the injection of at least one colloidal sol into a thermal plasma jet or flow. The sol may be injected into the plasma jet by any appropriate liquid injection means, for example by means of an injector, the sol injected being for example in the form of a jet or drops, preferably with a suitable momentum so that this is approximately the same as that of the plasma flow. Examples of injectors are given below.

According to the invention, it is possible to inject a single sol into the plasma, this sol possibly being a pure sol or else a sol containing particles that differ as regards their chemical composition and/or their particle size and/or their internal (dense or porous) structure.

Such a sol may for example comprise metal oxide particles, it being possible for said particles to be dense particles and/or mesoporous particles, these various particles having identical or different particle size.

It is also possible to inject several sols into the plasma, either simultaneously or not. In other words, it is possible to increase the number of points of injection into the plasma, thereby permitting a wide variety of combinations as regards especially the nature of the sprayed materials, their particle size and their dense or porous structure. Consequently, the porosity and the composition of the layer(s) deposited may also be perfectly controlled.

Each of these sols may be a "pure" sol or a "hybrid" (mixed) sol and differ in particular as regards its chemical composition and/or its particle size and/or its internal structure (porosity, for example intrinsic mesoporosity, dense particles) and/or its solvent and/or the nature of the various additives included in the different sols.

Furthermore, it is possible to inject into the plasma one or more "dry" nanopowders at the same time as the sol(s) or not. Said powders may have a composition similar to that of the nanoparticles of the sols described above and comprise, for example, one or more metal(s) oxide(s).

The thermal spraying, whether simultaneous or not, of sols and/or hybrid (mixed) sols and optionally also of nanopowders makes it possible to obtain nanoporous materials in which the pore size is perfectly controlled, in particular within the context of producing a nanoporous membrane.

If porous, for example mesoporous or mesostructured, nanoparticles are also used, a material will thus be obtained that has a degree of porosity at least on two scales in each layer.

The temperature of the sol during its injection may for example range from ambient temperature (20° C.) up to a temperature below its boiling point. Advantageously, the temperature of the sol at which it is injected may be controlled and modified, for example so as to be between 0° C. and 100° C. The sol therefore possesses a different surface tension, depending on the imposed temperature, resulting in a more or less rapid and effective fragmentation mechanism when it arrives in the plasma. The temperature may therefore have an effect on the quality of the coating obtained.

The sol injected, for example in drop form, penetrates into the plasma jet, where it explodes into a multitude of droplets under the effect of the shear forces of the plasma. The size of these droplets can be adjusted, according to the desired microstructure of the deposit, film, according to the properties of the sol (liquid) and of the plasma flow. Advantageously, the droplet size varies from 0.1 to 10 μm.

The kinetic and thermal energies of the plasma jet serve to disperse the drops into a multitude of droplets (fragmentation) and then to vaporize the liquid, respectively. When the liquid sol reaches the jet core, which is a high-temperature high-velocity medium, it is vaporized and the nanoparticles are accelerated and then collected on the substrate, so as to form a nanostructured deposit, film (coating) having a crystalline structure identical to that of the particles initially present in the starting sol. The vaporization of the liquid causes the fine nanoparticles of material belonging to the same droplet to come closer together and agglomerate. The resulting agglomerates, generally having a size of less than 1 μm, are within the core of the plasma, where they are melted, partially or completely, and then accelerated before being collected on the substrate. If there is complete melting of the agglomerates, the particle, grain, size in the deposit, film ranges from a few hundred nanometers to a few microns. However, if the melting is only partial, the particle size in the deposit, film is close to that of the particles contained in the starting liquid and the crystalline properties of the particles within the deposit, film are well preserved.

In general, thermal plasmas are plasmas producing a jet having a temperature ranging from 5000 K to 15000 K. When implementing the process of the invention, this temperature range is preferred. Of course, the temperature of the plasma used for spraying the sol onto the surface to be coated may be different. It will be chosen according to the chemical nature of the sol and of the coating desired. According to the invention, the temperature will be chosen so as to be preferably in a situation in which there is partial or total melting of the particles in the sol, preferably partial melting, so as to best maintain their starting properties within the layer.

The plasma may for example be an arc plasma, whether a transferred-arc plasma or not, or an inductive or radiofrequency plasma, for example in supersonic mode. The plasma may operate at atmospheric pressure or at lower pressure. Documents [14], [15] and [16] describe plasmas that can be used in the present invention and the plasma torches enabling them to be generated. Advantageously, the plasma torch used is an arc plasma torch.

According to the invention, the plasma jet may advantageously be generated from a plasma-forming gas chosen from the group comprising Ar, $H_2$, He and $N_2$. Advantageously, the plasma constituting the jet has a viscosity ranging from $10^{-4}$ to $5 \times 10^{-4}$ kg/m·s. Advantageously, the plasma jet is an arc plasma jet.

The substrate to be coated is, for obvious reasons, preferably positioned relative to the plasma jet so that the sprayed nanoparticles are directed onto the surface to be coated. Various trials may be carried out very easily to find an optimum position. The positioning is adjusted for each application, depending on the spraying conditions selected and on the desired microstructure of the film.

The deposit, film growth rate, which is high in a process for manufacturing finely structured layers, essentially depends on the percentage mass of material in the liquid and on the liquid flow rate. With the process of the invention, a nanoparticulate coating deposition rate of 1 to 100 µm/min may be readily obtained.

The thin nanoporous layers, coatings or membranes that can be obtained by the process of the invention, easily ranging in general from 1 to 100 µm, for example 10 to 100 µm, better still more than 10 to 20, 50 or 100 µm, in thickness, may consist of particles, grains, with a size of the order of one micron or less. They may be pure and homogeneous. By synthesizing a stable and homogeneous sol-gel solution of nanoparticles having a defined particle size associated with the liquid plasma spraying process of the invention, it is possible to maintain the intrinsic properties of the starting sol within the deposit, film and to obtain a nanostructured coating by advantageously controlling the following properties: porosity/density; compositional homogeneity; "exotic" stoichiometry (hybrid (mixed) sols and the aforementioned mixtures); nanoscale structure (size and crystalline phases); particle, grain size of the grains; homogeneous deposit, film thickness on an object having a complex shape; possibility of deposition on any type of substrate, whatever their nature and their roughness.

The process according to the invention may be carried out just once, that is to say a single layer is deposited, for example a membrane formed on the surface of the substrate.

The process of the invention may be implemented several times on the same substrate surface, with various sols and optionally one or more dry nanopowders—said sols differing in composition and/or in concentration and/or in particle size and/or in particle structure (dense or porous, for example mesoporous, particles)—in order to produce successive layers of various compositions and/or deposits, films of various pore sizes/porosities, for example with porosity gradients with large exchange areas. Such deposition of successive layers is useful, for example, in controlled-porosity layers.

The successive layers may have the same thickness or else different thicknesses. In the case of such multilayer stacks only the upper layer is generally called a membrane.

Because the nanoporous membrane according to the invention has a very small thickness, for example 1 to 100 µm, in order to achieve a high permeance, it must generally be mechanically structured by a thick permeable material. The thickness of this material depends on the operating pressure of the membrane and in general ranges from one millimeter to a few millimeters. Since this structuring substrate or support has a very large pore size, its surface roughness may be high. If the roughness ($R_a$) is greater than the thickness ($e_m$) of the nanoporous membrane deposited, this nanoporous membrane runs the risk of having holes, as shown in detail in FIG. 5. To reduce the roughness, a polishing operation may be carried out. One or more adapting layers having intermediate pore sizes $P_{1i}, P_{2i}, \ldots, P_{ni}$ may also be inserted between the nanoporous structuring support and the selective nanoporous layer. This therefore results in a pore size gradient along the thickness direction. This system is shown in detail in FIG. 6. These layers are deposited by thermal spraying of a sol or a sol/powder mixture. They are sufficiently permeable so as to give the (multilayer) stack (selective membrane/intermediate layers/porous support) a high permeance.

In other words, the substrate is formed by a porous support of pore size $d_s$ on which are deposited one or more (n) intermediate layers 1$i$, 2$i$, n$i$ having decreasing mean pore sizes $d_{1i}, d_{2i}, \ldots, d_{ni}$, where $d_{ni}<d_{2i}<d_{1i}<d_s$, by a process of spraying a sol or a mixture of one or more sol(s) and one or more nanopowder(s), and finally a nanoporous layer is deposited which has a mean pore size $d_m<d_{ni}$ on the last intermediate layer.

The thickness of the membrane is finely controlled (±2 µm) thanks to the very small thickness (less than 1 µm or less than a few microns) of the layers deposited at each pass of the torch. Moreover, producing the membrane by successive stacking of many very thin layers guarantees the homogeneity of the membrane and the absence of through-defects therein.

After the production of said nanoporous particulate layer(s), this(these) is(are) functionalized, either completely or partly, so as for example to give it(them) selectivity with respect to a fluid.

The functionalization of the surface by covalent grafting, for example of hydrophobic molecules (of the perfluorinated or alkyl type for example), is carried out in the case of the membrane being used for phase separation (for example air/water separation). Since the membrane is no longer wetted by one of the fluids, this is blocked on the surface, whereas the other phase passes through the membrane. However, the pore size of the membrane must be small enough to be able to block one of the phases in view of the Jurin-Washburn law stated below:

$$P_g = \frac{2\gamma\cos\theta}{r},$$

where $P_g$ is the droplet pressure defined by the pressure to be applied so as to make the fluid pass through the membrane, $\gamma$ is the surface tension between the two phases to be separated, θ is the droplet angle between the retained phase and the membrane, and r is the radius of the largest pore of the nanoporous layer.

Furthermore, according to the invention it is possible to functionalise, in a different and specific manner, various, porous surfaces, zones of the layer(s) or membrane(s), thereby enabling these membranes to be used for selective retention. Likewise, in the case of several layers, it is possible to functionalize each layer in a different manner.

The spraying process of the present invention is easily carried out on an industrial scale since its specificity resides in particular in the injection system, which can be fitted to any thermal spraying machine already present in the industry, in the nature of the sol-gel solution and in the choice of the plasma conditions for obtaining a nanostructured coating having the properties of the sprayed particles.

A device for coating a surface of a substrate that can be used to implement the process of the invention may comprise the following elements:

- a thermal plasma torch capable of producing a plasma jet;
- a plasma-forming gas container;
- a nanoparticulate colloidal sol container;
- a means for fixing the substrate and for moving it relative to the plasma torch;
- an injection system connecting, on the one hand, the colloidal sol container and, on the other hand, an injector, the end of which is microperforated with a hole for injecting the colloidal sol into the plasma jet generated by the plasma torch; and
- a pressure reducing gauge (regulator) for adjusting the pressure inside the container.

Advantageously, the plasma torch is capable of producing a plasma jet having a temperature ranging from 5000 K to 15000 K. Advantageously, the plasma torch is capable of producing a plasma jet having a viscosity ranging from $10^{-4}$ to $5 \times 10^{-4}$ kg/m·s. Advantageously, the plasma torch is an arc plasma torch. Examples of plasma-forming gases were given above and containers for these gases are commercially available. The reasons for these advantageous choices were explained above.

Advantageously, the device of the invention comprises several containers respectively containing several nanoparticulate sols, the sols differing from one another by their composition and/or the diameter, size, of the nanoparticles and/or their concentration. The device of the invention may further include a cleaning liquid container, for cleaning the pipework and the injector. Thus, the pipework and the injector may be cleaned between each implementation of the process.

The containers may be connected to a compressed-air supply system by pipes and to a source of compressing gas, for example compressed air. One or more pressure reducing gauge(s) (regulator(s)) are used to adjust the pressure inside the container(s). The pressure depends on the injection line, on the rheology of the sol and on the plasma conditions, and is generally less than a pressure of $2 \times 10^6$ Pa (20 bar), but may be higher. In this case, under the effect of the pressure, the liquid is conveyed to the injector, or to the injectors if there are several of them, by pipes, and is then expelled from the injector, for example in the form of a liquid jet that mechanically fragments to form large drops, preferably of calibrated diameter, on average twice as large as the diameter of the circular exit hole. A pump can also be used. The flow rate and the momentum of the sol exiting the injector depend in particular on:

- the pressure in the container used and/or of the pump;
- the dimensional characteristics of the exit orifice (depth diameter); and
- the rheological properties of the sol.

The injector is used to inject the sol into the plasma. It is preferably such that the injected sol mechanically fragments on leaving the injector in the form of drops, as indicated above. According to the invention, the hole of the injector may have any shape allowing the colloidal sol to be injected into the plasma jet, preferably under the aforementioned conditions. Advantageously, the hole is circular. Advantageously, the hole of the injector has a diameter of 10 to 500 μm. According to the invention, the device may be provided with several injectors depending for example on the amounts of sol to be injected.

According to one particular embodiment of the device, the angle of inclination of the injector to the longitudinal axis of the plasma jet may vary from 20 to 160°. Advantageously, the injector may also be moved in the longitudinal direction of the plasma jet. This movement is indicated schematically in the appended FIG. 2. Thus, the colloidal sol injected into the plasma jet may have a certain orientation. This orientation allows the injection of the colloidal sol to be optimized and therefore the coating sprayed onto the surface of the substrate to be formed.

The sol injection line may be thermostated so as to control and optionally modify the temperature of the injected sol. The temperature may be controlled and modified in the pipes and/or in the containers.

The device may also include one or more devices for injecting nanoparticulate powders into the plasma.

The device may include a means for fixing the substrate and for moving it relative to the plasma torch. This means may consist of clamps or an equivalent system, enabling the substrate to be clamped (fixed) and held in place in a chosen position during the plasma spraying, and of a means for rotating the surface of the substrate and for moving it translationally so as to face the plasma jet and in the longitudinal direction of the plasma jet. Thus, the position of the surface to be coated, relative to the plasma jet, may be optimized so as to obtain a homogeneous coating.

More precisely, the experimental set-up shown in FIGS. 1 and 2 allowed the nanostructured deposits, films of the examples to be produced. This consists of:

- a Sulzer-Metco F4 VB (trademark) DC plasma torch (3) provided with an anode of 6 mm inside diameter;
- the liquid injection system described in FIG. 1; and
- a device (9) for fixing the substrate to be coated and for moving it relative to the torch over a given distance (FIG. 2).

The injection system comprises a container ($C_S$), containing the colloidal sol (7), and a cleaning liquid container ($C_L$), containing a liquid (L) for cleaning the injector and the pipework (p). The system also includes pipes (p) for conveying the liquids from the containers to the injector (I) and pressure reducing gauges (regulators) (PR) for adjusting the pressure in the containers (pressure<$2 \times 10^6$ Pa). All these are connected to a compressing gas (G), here air, for creating a compressed-air supply in the pipes. Through the effect of the pressure, the liquid is conveyed to the injector.

As regards the liquid injection, the diameter of the exit orifice (e) of the injector (I) is for example 105 μm and the pressure in the sol container ($C_s$) is for example 0.4 MPa. This provides a liquid flow rate of for example 20 ml/min and a flow speed for example of 16 m/s. The sol exits the injector in the form of a liquid jet, which mechanically fragments to form large drops with a calibrated diameter ranging for example from 2 μm to 1 mm, on average twice as large as the diameter of the circular exit hole. The injector (FIG. 2) may be inclined to the axis of the plasma jet, for example by 20° to 160°, even for example 90°.

An example of a device suitable for implementing the process according to the invention is also described in FIG. 3. This comprises a container (31) containing a sol, suspension or mixture that feeds an injector (32) of a calibrated diameter, for example 300 µm, which injects said sol, hybrid (mixed) sol, suspension or mixture into a plasma (33) generated by a plasma torch (34) supplied with gas (35), such as Ar, $H_2$, He, $N_2$.

In a first zone (36), the solvent for the sol, suspension or mixture is evaporated and, in a nanoparticle treatment second zone (37), the nanoparticles are cryogenically cooled before being deposited in the form of a nanostructured deposit, film on a porous support (38) provided with an intermediate layer (39).

The invention allows direct injection, thanks to a properly adapted injection system, for example using the device described above, of a stable nanoparticulate suspension or solution, called a "sol", since it results from the synthesis of a colloid by the sol-gel process involving the hydrolysis-condensation of metal precursors (salts or alkoxides) enabling the particles to be easily stabilized and dispersed in their growth medium.

The main advantages of the present invention over the processes of the prior art are:
- the size and the particle size distribution of the nanoparticles is maintained;
- the crystalline state of the sprayed material is maintained;
- the initial stoichiometry and the state of homogeneity are maintained;
- a deposit, film having a high porosity, and therefore a high permeance, is deposited;
- the porosity of the film is controlled;
- there is no difficulty in obtaining submicron coating thicknesses, unlike in the conventional thermal spraying process of the prior art;
- an excellent and unusually high thermal spraying weight efficiency is obtained, by limiting material losses, i.e. a deposited mass/sprayed mass ratio greater than 80% by weight;
- the temperatures to which the sprayed materials are exposed are reduced, thus permitting the use of heat-sensitive compositions and even heat-sensitive substrates;
- the possibility, hitherto unprecedented, of making deposits, films on supports of any type and of any roughness, such as glass or mirror-polished silicon wafers (in the latter case, the very low surface roughness of the substrates prevented adhesion of the coatings);
- functionalizable deposits, films can be prepared by choosing the chemical composition sprayed—this helps to improve the selectivity of the membrane thus obtained;
- it is possible to deposit particles having different particle sizes and/or intrinsically mesoporous or mesostructured particles. This allows the production of materials having porosity gradients with large exchange areas that can be used in multiscale filtration (having several levels of filtration or in selective retention);
- the capability of producing coatings with an $SiO_2$ composition by thermal spraying, which composition was hitherto beyond the capability of the conventional processes; and
- mechanically resistant and adherent coatings are obtained.

The present invention is applicable in all technical fields where it is necessary to obtain a nanoporous coating or nanoporous membrane having a calibrated pore size and a high permeance. As non-exhaustive examples, the present invention can be used in the following applications:

- ultrafiltration;
- purification;
- gas separation;
- separation of different phases (for example water/oil separation);
- heterogeneous catalysis;
- self-supported chemical reactors;
- gas diffusion; and
- sensors or preconcentrators.

The invention also relates to a nanoporous layer capable of being obtained (obtainable) by the process described above and to a substrate having at least one surface coated with at least one nanoporous layer as described above.

The present invention therefore also relates to an ultrafiltration, purification, gas separation, phase separation or heterogeneous catalysis device, to a self-supported chemical reactor, to a gas diffusion device, or to a sensor comprising at least one nanoporous layer capable of being obtained (obtainable) by the process of the invention, that is to say one having the physical and chemical characteristics of the coatings obtained by the process of the invention.

Other features and advantages of the invention will become apparent on reading the following examples given by way of illustration but implying no limitation, with reference to the appended drawings.

EXAMPLE 1

Figure 1:
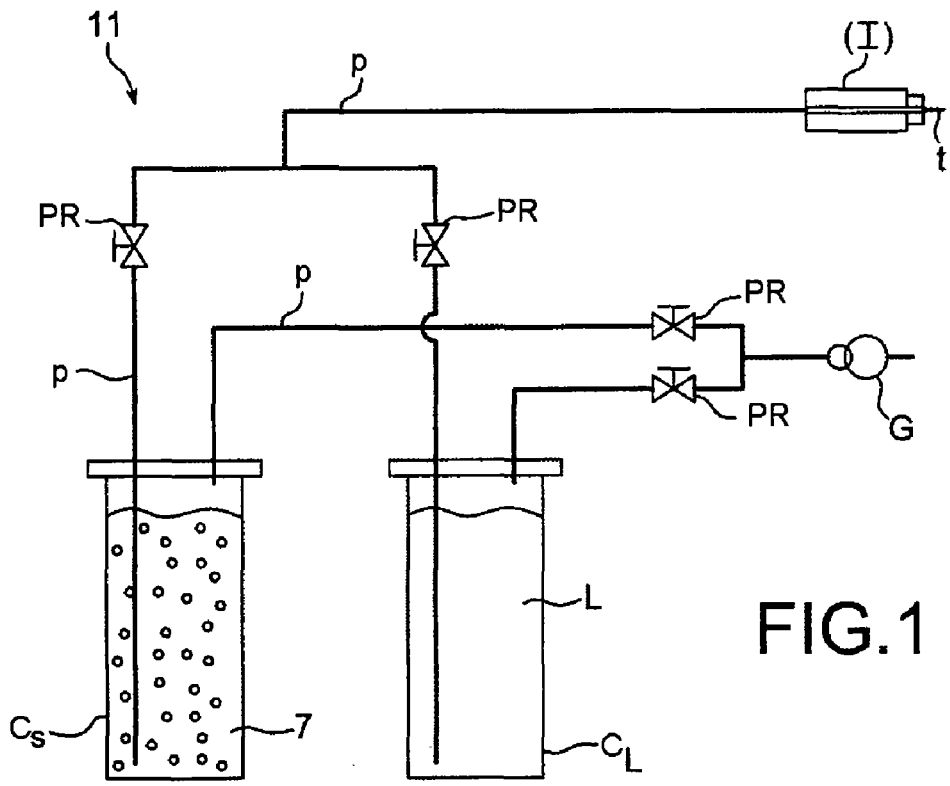
FIG. 1 shows a simplified diagram of part of a device for implementing the process of the invention, enabling the nanoparticulate colloidal sol to be injected into a plasma jet.
Figure 2:
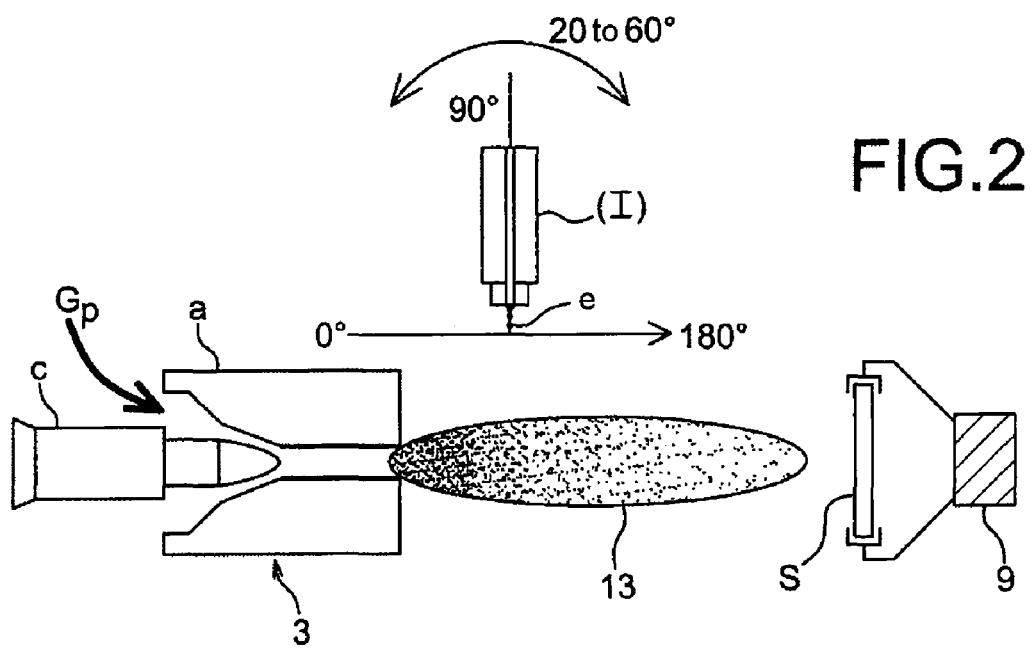
FIG. 2 shows a simplified diagram of one method of injecting a nanoparticulate colloidal sol into a plasma jet, the plasma torch being shown schematically.
Figure 3:
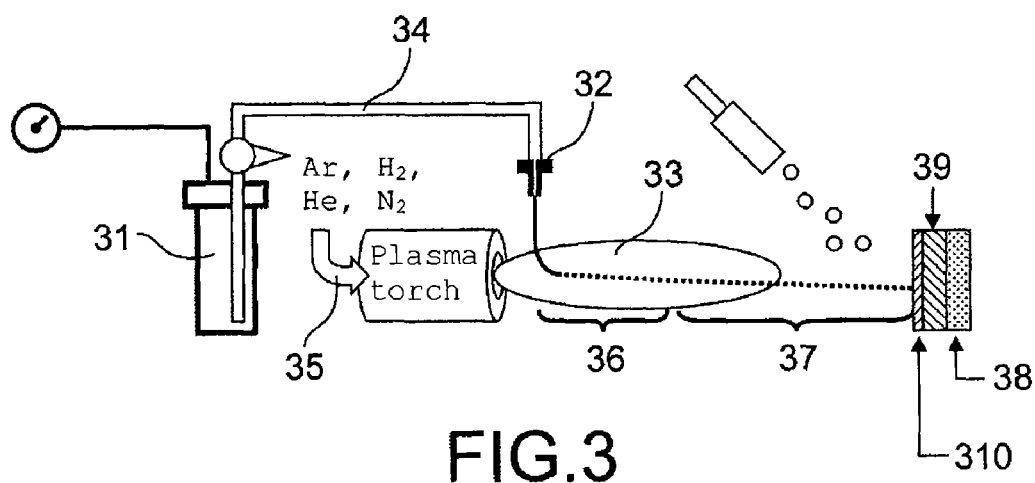
FIG. 3 shows a sectional schematic view of a device for implementing the process according to the invention.

Example 1 describes the production of an ultrafiltration membrane on porous metal discs 2 mm in thickness.

The metal support chosen (PORAL C15 from Federal Mogul) was coarsely porous (mean pore diameter about 20 μm). The selective nanoporous layer 5 μm in thickness could not be deposited directly on this substrate. An intermediate layer was then applied, from alumina with a particle size of 400 nm.

A monodisperse aqueous acid suspension of alumina with a particle size of 400 nm was injected into an argon/hydrogen (8 vol % $H_2$) transferred-arc plasma by means of a container pressurized to 3 bar. The exit diameter of the injector used was calibrated to 200 μm. The plasma torch (F100 CONNEX from Sulzer Metco) was fixed facing a mandrel, where the metal discs were positioned. During spraying, the torch underwent a to-and-fro translational movement along the rotation axis of the mandrel so as to scan the entire surface of the specimens. The deposit, film thus formed had a thickness of 60 μm, with a porosity of 60% and a mean pore diameter of 130 nm.

A 5% aqueous silica sol with a particle size of 33 nm was injected into the hot (8000-15000 K) zone of a thermal plasma under the same conditions and using the same means as the previous layer. A deposit, film 5 μm in thickness with a pore size of 10 nm, corresponding to the specific requirements of an ultrafiltration membrane, was obtained. The permeance of the multilayer stack (metal support/$Al_2O_3$ intermediate layer/selective membrane) was about 1300 Sl/min/bar/$m^2$. This value could be increased by optimizing the intermediate layer.

EXAMPLE 2

Example 2 describes the manufacture of an ultrafiltration membrane on a ceramic support.

A porous alumina/titania substrate was produced beforehand by thermal spraying. Its porosity was 35% and its thickness 0.7 mm.

Figure 7:
FIG. 7 is a micrograph obtained in scanning electron microscopy. This shows, in cross section, a nanoporous membrane produced by the process according to the invention, made up of an alumina/silica mixture and supported by a support, such as a porous alumina/titania support. The scale shown on the micrograph is 10 µm.

A 5% aqueous silica sol, with a particle size of 60 nm, was mixed with 7.5 wt % of a monodisperse alumina powder of 150 nm particle size. This mixture was injected into the hot (8000-15000 K) zone of a thermal plasma under the same conditions as in Example 1 and using the same means. A 30 μm thick deposit, film with a pore size of 30 nm, corresponding to the specific requirements of an ultrafiltration membrane, was obtained. The permeance of the multilayer stack (metal support/$Al_2O_3$ intermediate layer/selective membrane) was about 800 Sl/min/bar/$m^2$. FIG. 7 is a micrograph of a section through this membrane.

Figure 8:
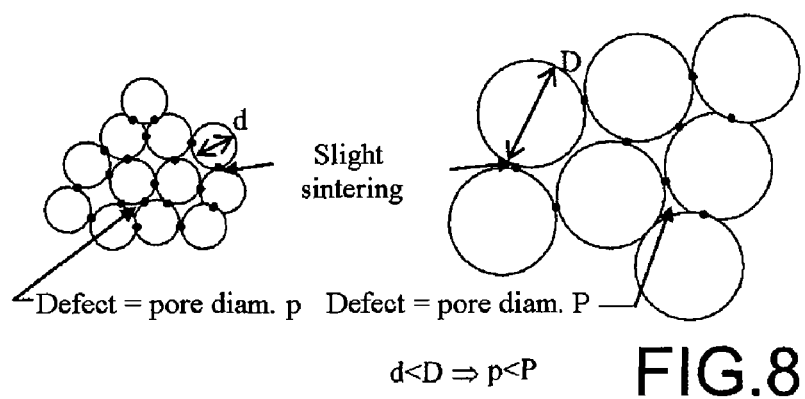
FIG. 8 is a sectional schematic view showing the multilayer stack structure in two nanoporous deposits, films prepared by sol spraying in accordance with the process of the invention. The two deposits, films are prepared from spherical particles differing in size. The diagram on the left corresponds in particular to a deposit, film obtained in Example 1, whereas the diagram on the right corresponds in particular to a deposit, film obtained in Example 2.

FIG. 8 may be examined in relation to Examples 1 and 2.

Example 1 (left-hand diagram in FIG. 8) shows the formation of a membrane having a pore size distribution centred on 10 nm from a silica sol of particle size d=33 nm.

In Example 2 (right-hand diagram in FIG. 8), the use of a sol of larger particle size D=60 nm mixed with a 150 nm alumina powder makes it possible to increase the size of the stacking faults and thus the pore size (P), centred on 30 nm.

EXAMPLE 3

Example 3 describes the production of an ultrafiltration membrane on a ceramic support.

A 10% aqueous mesoporous silica sol of particle size 40 nm was injected into a thermal plasma under the same conditions as in Example 1 and using the same means.

EXAMPLE 4

Example 4 describes the production of a phase separation membrane on a ceramic support.

A porous alumina/titania substrate was produced beforehand by thermal spraying. Its porosity was 35% and its thickness 0.7 mm.

A 5% aqueous silica sol of particle size 60 nm was mixed with 7.5 wt % of a monodisperse alumina powder of 150 nm particle size. This mixture was injected into a thermal plasma under the same conditions as in Example 1 and using the same means. A film with a thickness of 30 μm and a pore size of 30 nm was obtained.

The supported membrane was immersed in water at 80° C. for 5 h and then heated in an oven at 110° C. for 10 h. It was then dipped into a fluorinated solvent containing 1% of a fluoroalkoxysilane ($CF_3(CH_2)_5Si(OCH_3)_3$) derivative for 48 h. A heat treatment at 130° C. for 1 h 30 min created a covalent bond between the silane and the metal oxide, forming the membrane. The membrane was thus hydrophobic. The contact angle of a water drop was about 110°. The membrane retained the water up to high pressures (>10 bar) but remained gas-permeable.

EXAMPLE 5

This example describes the deposition of a mesoporous silica deposit, film by the plasma spraying of an aqueous silica sol.

A 4% aqueous mesoporous silica sol with a particle size between 20 and 40 nm was sprayed onto porous ceramic substrates identical to those of Example 2 and onto a silicon wafer for micrographic analysis.

The size of the mesopores of the initial particles was 2 and 3 nm in diameter. These mesopores adopted a P6m hexagonal structure.

Figure 4:
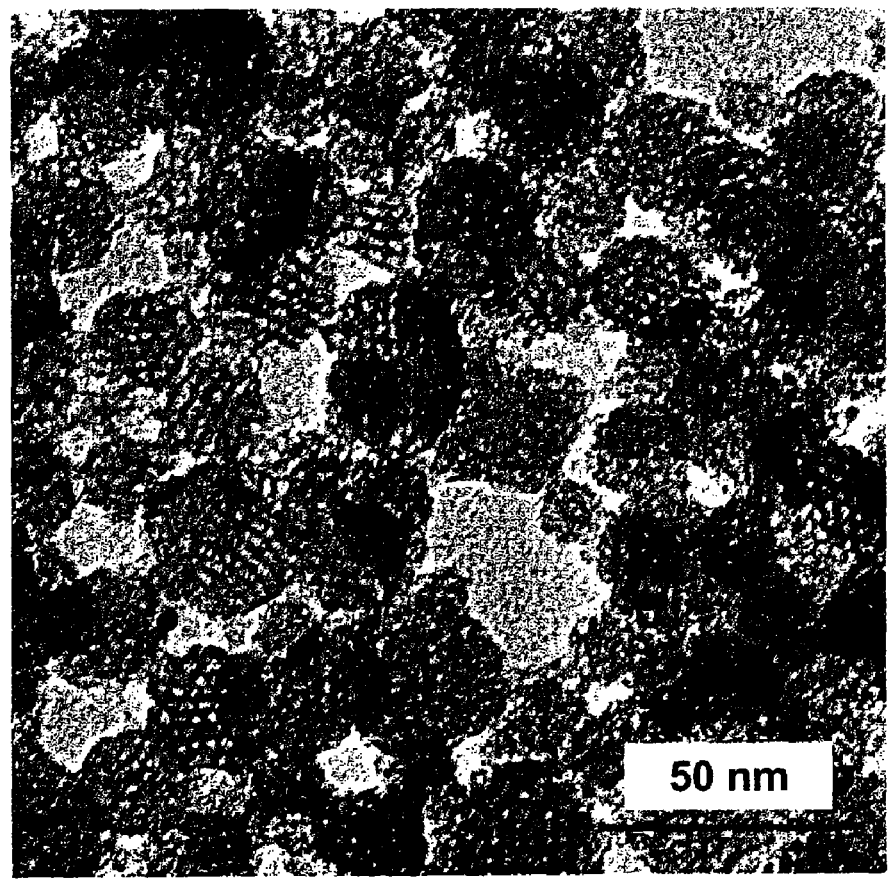
FIG. 4 is a micrograph obtained in transmission electron microscopy of a mesoporous silica sol (Example 3) used in the process according to the invention—the scale shown on the micrograph is 50 nm.
Figure 5:
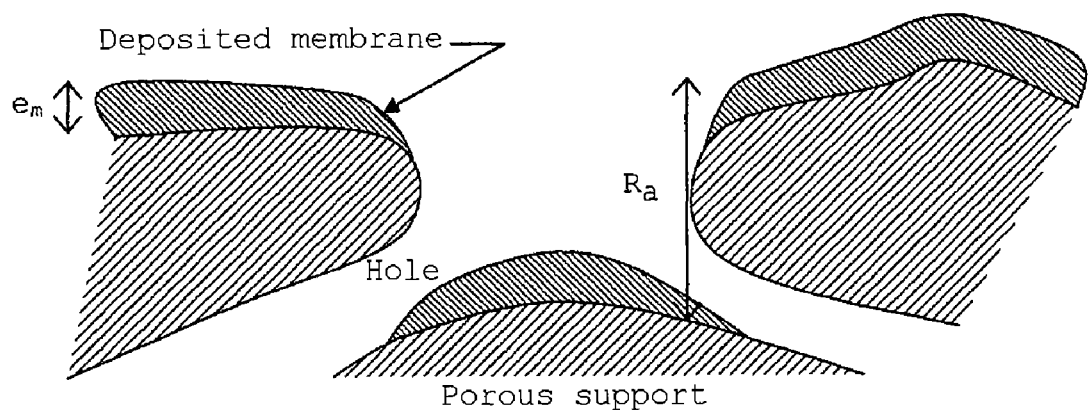
FIG. 5 is a sectional schematic view of a nanoporous membrane deposited by the process of the invention on a nanoporous support. The thickness of the deposited membrane is $e_m$ and the surface roughness of the support is $R_a$.
Figure 6:
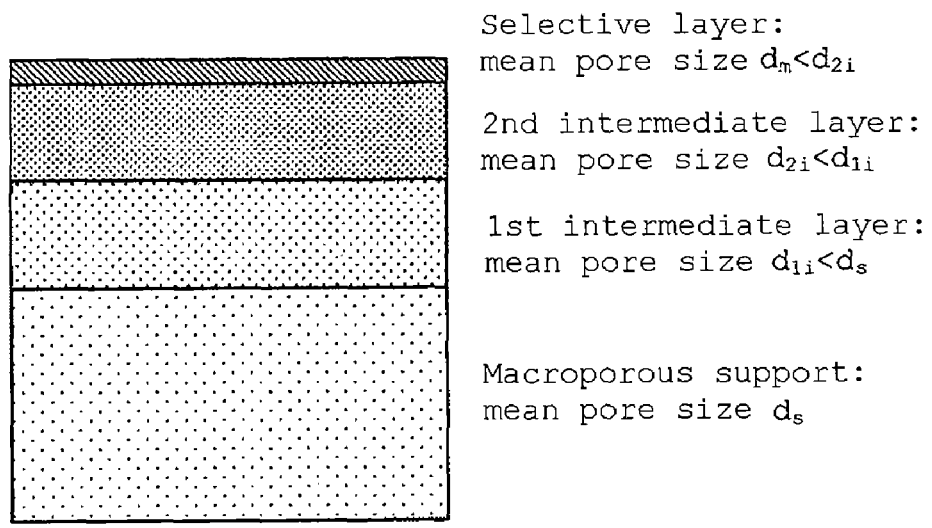
FIG. 6 is a schematic view showing a layer or membrane according to the invention deposited on a nanoporous support. Provided between the nanoporous support and the membrane are a first intermediate layer and a second intermediate layer. The pore size of the nanoporous support is $d_s$. The mean pore sizes of the first intermediate layer, of the second intermediate layer and of the membrane are $d_{1i}$, $d_{2i}$ and $d_m$ respectively, where $d_m < d_{2i} < d_{1i} < d_s$.
Figure 9:
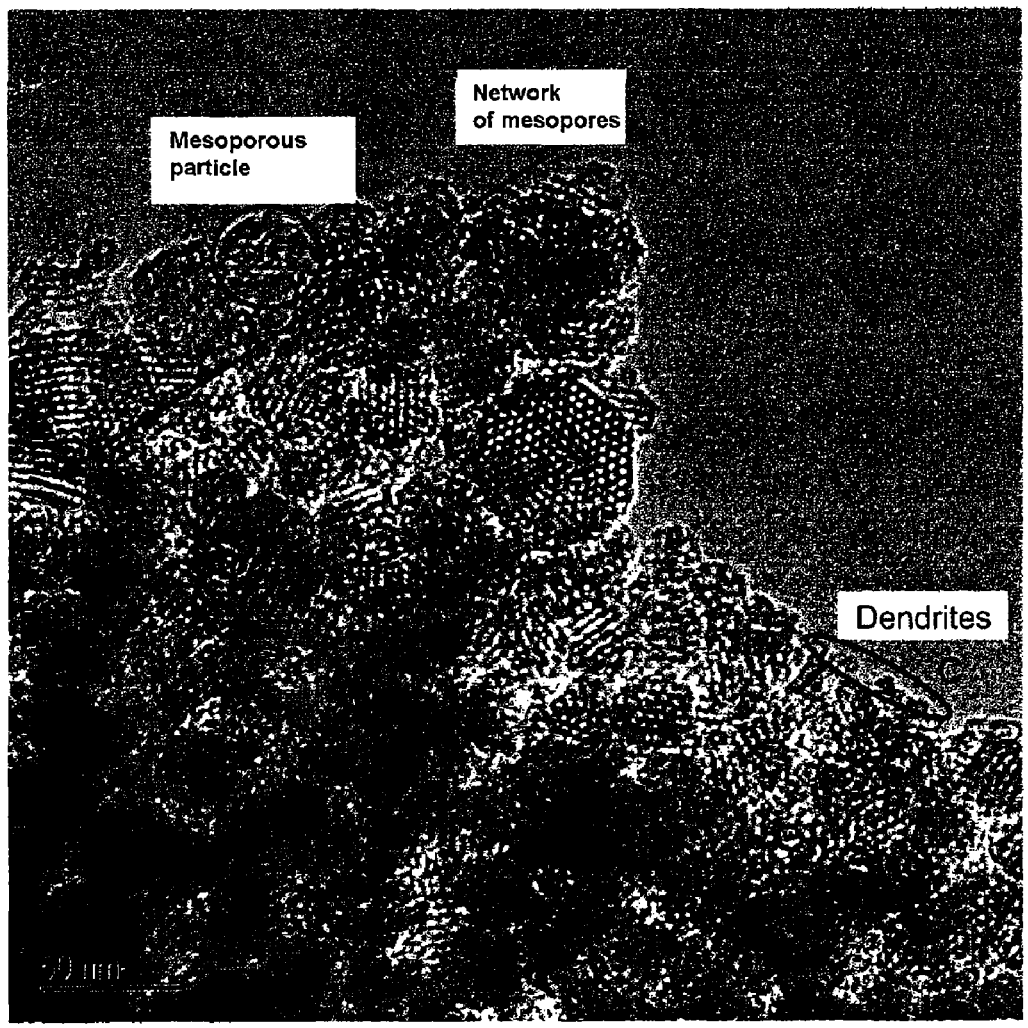
FIG. 9 is a micrograph obtained in transmission electron microscopy on a section of a mesoporous silica deposit, film prepared on a silicon wafer by the plasma spraying of an aqueous silica sol. The scale shown on the micrograph is 50 nm. In this figure, the zone A represents a mesoporous particle, the zone B represents a lattice of mesopores and the zone C represents dendrites.

FIG. 9 shows a micrograph obtained by transmission electron microscopy of the mesoporous sol deposit, film on the silicon wafer. It may be seen that the particles remain identifiable and distinguished from one another, but when they are compared with their initial shape (see FIG. 4), they have dendrites on the periphery. This corresponds to partial melting, on the surface, of the material, in this case of the silica. The inside of the particle remains in its original state, as the micrograph of FIG. 9 attests—the mesoporous structure is therefore preserved.

More precisely, FIG. 9 shows for example a mesoporous particle (A), a lattice of mesopores (B) and dendrites (C).

LITERATURE REFERENCES

[1] U.S. Pat. No. 5,032,568, Lau et al., 1991.
[2] U.S. Pat. No. 4,982,067, Marantz et al., 1991.
[3] U.S. Pat. No. 5,413,821, Ellis et al., 1995.
[4] U.S. Pat. No. 5,609,921, Gitzhofer et al., 1997.
[5] U.S. Pat. No. 6,447,848, Chow et al., 2002.

[6] WO-A-97/18341, Kear et al., 1997.

[7] N. P. Rao, H. J. Lee, D. J. Hansen, J. V. R. Heberlein, P. H. McMurry and S. L. Girshick, "Nanostructured Materials production by Hypersonic Plasma Particle Deposition", *Nanostructured Materials*, 1997, 9, pp. 129-132.

[8] FR-A-2 707 763 (CEA), H. Floch and P. Belleville, "Matériau composite à indice de réfraction élevé, procédé de fabrication de ce matériau composite et matériau optiquement actif comprenant ce matériau composite [*High refractive index composite material, process for producing this composite material and optically active material comprising this composite material*]".

[9] FR-A-2 682 486 (CEA), H. Floch and M. Berger, "Miroir diélectrique interférentiel et procédé de fabrication d'un tel miroir [*Dielectric interference mirror and process for producing such a mirror*]".

[10] FR-A-2 703 791 (CEA), p. Belleville and H. Floch, "Procédé de fabrication de couches minces présentant des propriétés optiques et de résistance à l'abrasion [*Process for producing thin films having optical and abrasion-resistance properties*]".

[12] W. Stöber, A. Fink and E. Bohn, *Journal of Colloid and Interface Science*, 26, 1968, pp. 62-69.

[13] "Functional Hybrid Materials", P. Gomez-Romero and C. Sanchez, published by Wiley-VCH, 2004.

[14] "Plasmas thermiques: Production et applications [*Thermal plasmas: Production and applications*]", P. Fauchais, Techniques de l'ingénieur, traité génie électrique, D2820-1 to D2820-25.

[15] "Characterizations of LPPS processes under various spray conditions for potential applications", A. Refke, G. Barbezat, J L. Dorier, M. Gindrat and C. Hollenstein, Proc. International Thermal Spray Conference 2003, Orlando, Fla., USA, 5-8 May 2003.

[16] "New applications and new product qualities by radiofrequency plasma spraying", R. Henne, V. Borck, M. Müller, R. Ruckdäsch and G. Schiller, Proceedings of the United Thermal Spray Conference, Düsseldorf, 17-19 Mar. 1999.

[17] S. Somiya, M. Yoshimura, Z. Nakai, K. Hishinuma and T. Kumati, "Hydrothermal processing of ultrafine single crystal zirconia and hafnia powders with homogeneous dopants", *Advances in ceramics*, 21, 1987, pp. 43-55.

[18] US-A1-2004/0229031, Gell et al., 2004.

[19] EP-A1-1 134 302, Baglioni et al., 2001.

The invention claimed is:

1. A process for producing at least one nanoporous layer of nanoparticles selected from the group consisting of nanoparticles of a metal oxide, nanoparticles of metal oxides, and mixtures of said nanoparticles, on a surface of a substrate, wherein at least one colloidal sol, in which said nanoparticles are dispersed and stabilized, is injected into a thermal plasma jet that sprays said nanoparticles onto said surface, wherein the nanoparticles have a size of 1 to 500 nm.

2. The process of claim 1, wherein the nanoparticles have a particle size centered on one or more peaks.

3. The process of claim 1, wherein the metal oxide or metal oxides are selected from the group consisting of $SiO_2$, $ZrO_2$, $TiO_2$, $Ta_2O_5$, $HfO_2$, $ThO_2$, $SnO_2$, $VO_2$, $In_2O_3$, $Sb_2O_3$, $CeO_2$, $ZnO$, $Nb_2O_5$, $V_2O_5$, $Al_2O_3$, $Sc_2O_3$, $Ce_2O_3$, $NiO$, $MgO$, $Y_2O_3$, $WO_3$, $BaTiO_3$, $Fe_2O_3$, $Fe_3O_4$, $Sr_2O_3$, $(PbZr)TiO_3$, $(BaSr)TiO_3$, $CO_2O_3$, $Cr_2O_3$, $Mn_2O_3$, $Mn_3O_4$, $Cr_3O_4$, $MnO_2$ and $RuO_2$.

4. The process of claim 1, wherein the sol is produced by precipitation in an aqueous medium or by sol-gel synthesis in an organic medium starting from a nanoparticle precursor.

5. The process of claim 4, wherein the nanoparticle precursor is selected from the group consisting of a metalloid salt, a metal salt, a metal alkoxide and a mixture of these.

6. The process of claim 5, wherein the metal or metalloid of the nanoparticles precursor salt or alkoxide is selected from the group consisting of titanium, zirconium, hafnium, aluminium, tantalum, niobium, cerium, nickel, iron, zinc, chromium, magnesium, cobalt, vanadium, barium, strontium, tin, scandium, indium, lead, yttrium, tungsten, manganese, gold, silver, platinum, palladium, nickel, copper, cobalt, ruthenium, rhodium, europium and other rare earths.

7. The process of claim 1, wherein the sol is a sol of nanoparticles of metal oxides.

8. The process of claim 1, wherein all or some of the nanoparticles are intrinsically porous, macroporous, microporous, mesoporous or mesostructured particles.

9. The process of claim 1, wherein all or some of the particles are dense particles and the sol optionally contains a texturizing agent and/or a pore-forming agent.

10. The process of claim 1, wherein the sol is a hybrid sol.

11. The process of claim 1, wherein the sol further comprises organic molecules.

12. The process of claim 11, wherein the organic molecules are molecules for stabilizing the nanoparticles in the sol, molecules that functionalize the nanoparticles, and/or texturizing and/or pore-forming agents.

13. The process of claim 1, wherein the nanoporous layer has a pore size of 1 to 500 nm.

14. The process of claim 1, wherein the nanoporous layer has a porosity equal to or greater than 20%.

15. The process of claim 1, wherein, after the production of said nanoporous layer of particles, the layer is functionalized, either completely or partly.

16. The process of claim 15, wherein said nanoporous layer of particles is completely or partly functionalized by covalent grafting of molecules.

17. The process of claim 16, wherein said grafted molecules are hydrophobic molecules.

18. The process of claim 1, wherein the substrate is selected from the group consisting of metal substrates, ceramic substrates and heat-sensitive substrates.

19. The process of claim 1, wherein said surface of the substrate is a convex surface, a concave surface, or a surface of a cavity internal to a part.

20. The process of claim 1, wherein the colloidal sol is injected in drop or jet form into the plasma jet.

21. The process of claim 1, wherein the plasma jet is an arc plasma jet.

22. The process of claim 1, wherein the plasma jet causes partial melting of the injected nanoparticles.

23. The process of claim 1, wherein the plasma constituting the jet has a temperature ranging from 5000 K to 15000 K.

24. The process of claim 1, wherein the plasma constituting the jet has a viscosity ranging from $10^{-4}$ to $5 \times 10^{-4}$ kg/m.s.

25. The process of claim 1, wherein the plasma jet is generated from a plasma-forming gas selected from the group consisting of Ar, $H_2$, He, $N_2$, or combinations thereof.

26. The process of claim 1, wherein the sol is injected into a hot zone of the plasma jet, wherein the zone temperature ranges from 8000 to 15000 K, and a solvent for said sol is chosen from water and liquids that consume a large amount of energy to vaporize.

27. The process of claim 1, wherein the sol is injected into a cold zone of the plasma jet, wherein the zone temperature ranges from 3000 to 4000 K, and a solvent for said sol is chosen from alcohols having 1 to 5 carbon atoms.

28. The process of claim 1, wherein several sols are injected into the thermal plasma jet, either simultaneously or not, each of the sols being able to differ as regards its chemical composition, particle size, its internal structure, its solvent, and/or the nature of the additives.

29. The process of claim 1, wherein one or more "dry" nanopowders are injected into the thermal plasma jet.

30. The process of claim 1, wherein the process is implemented several times on the same substrate surface with various sols, said sols differing in composition, concentration, particle size, particle structure, and, optionally, with various dry nanopowders to produce successive layers of various compositions and/or various porosities.

31. The process of claim 1, wherein the substrate comprises a porous support of pore size $d_s$ on which are deposited one or more intermediate layers $1i$, $2i$, ni having decreasing mean pore sizes $d_{1i}, d_{2i}, \ldots, d_{ni}$, where $d_{ni} < \ldots < d_{2i} < d_{1i} < d_s$, by a process of spraying a sol or a mixture of one or more sols and one or more nanopowders, and finally a nanoporous layer is deposited which has a mean pore size $dm < d_{ni}$ on the last intermediate layer.

32. A nanoporous layer obtainable by the process of claim 1, having a porosity equal to or greater than 20%, wherein the metal oxide nanoparticles do not undergo any modification upon being sprayed and wherein the nanoporous layer has the same composition as the at least one colloidal sol.

33. The nanoporous layer of claim 32, having a thickness of 0.1 μm to 5 mm.

34. A substrate having at least one surface coated with the nanoporous layer of claim 32.

35. An ultrafiltration, purification, gas separation, phase separation or heterogeneous catalysis device; self-supported chemical reactor; gas diffusion device or sensor comprising the nanoporous layer of claim 32.

* * * * *